R. H. RAMSEY.
Portable and Stationary Gas Apparatus.
No. 169,291. Patented Oct. 26, 1875.
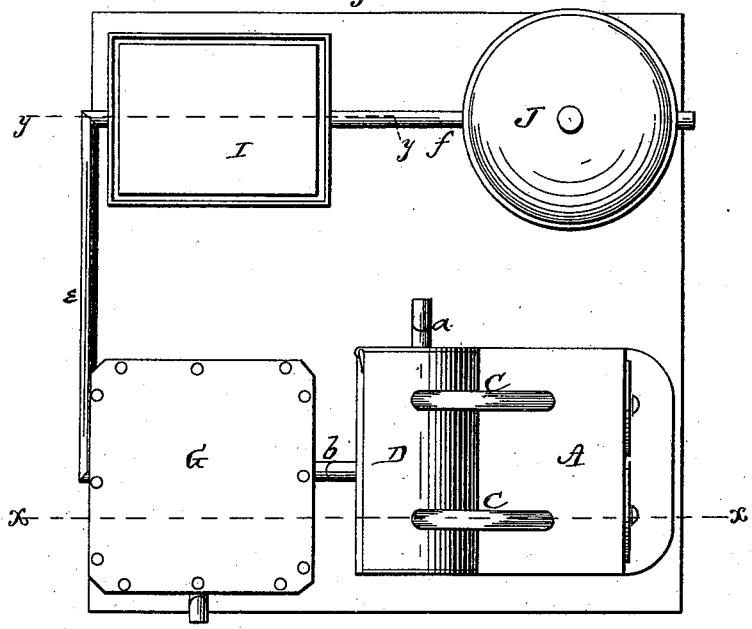
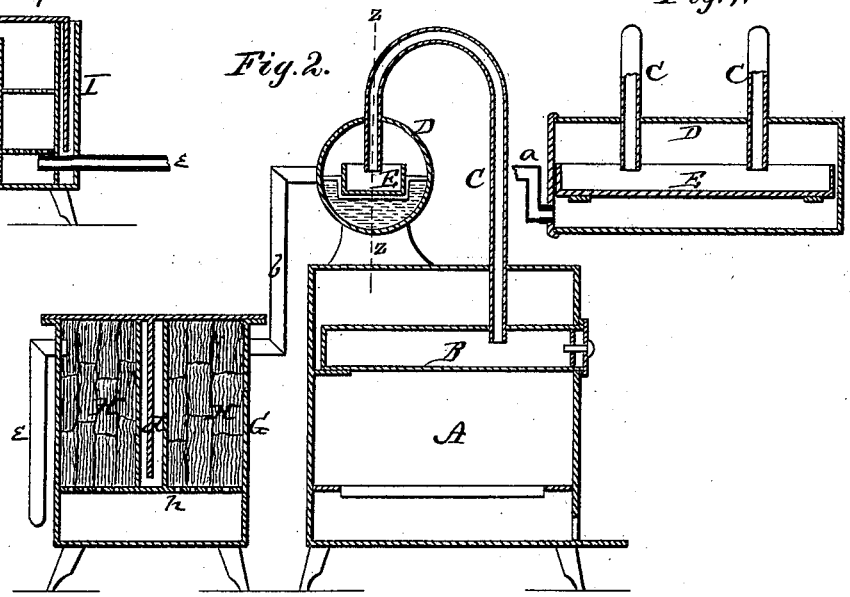

UNITED STATES PATENT OFFICE.

ROBERT H. RAMSEY, OF POTTSVILLE, PENNSYLVANIA.

IMPROVEMENT IN PORTABLE AND STATIONARY GAS APPARATUS.

Specification forming part of Letters Patent No. 169,291, dated October 26, 1875; application filed October 4, 1875.

*To all whom it may concern:*

Be it known that I, ROBERT H. RAMSEY, of Pottsville, in the county of Schuylkill and in the State of Pennsylvania, have invented certain new and useful Improvements in Portable and Stationary Gas Apparatus; and do hereby declare that the following is a full, clear, and exact description thereof, reference being had to the accompanying drawings, and to the letters of reference marked thereon, making a part of this specification.

My invention relates to coal-gas machines; and it consists in the construction of a dry-scrubber used therewith, and the process for purifying the gas, as hereinafter more fully set forth.

In order to enable others skilled in the art to which my invention appertains to make and use the same, I will now proceed to describe its construction and operation, referring to the annexed drawing, in which—

Figure 1 is a plan view of my machine. Fig. 2 is a vertical section of the same through the line $x$ $x$, Fig. 1. Fig. 3 is a section through the line $y$ $y$, Fig. 1; and Fig. 4 is a section through the line $z$ $z$, Fig. 2.

A represents any ordinary furnace, containing one or more retorts, B, for the manufacture of gas from coal, constructed in any of the known and usual ways. From each of the retorts B a pipe, C, conducts the gas into a cylinder, D. This cylinder contains within it a pan, E, elevated a suitable distance from the bottom thereof. At one end of the cylinder D is a siphon, $a$, extending up on the outside to the level of the water in the cylinder. The ends of the pipes C C are carried down a short distance into the pan E.

The condensed tar fills the pan E and the ends of the pipes C therein, thus sealing said pipes. The overflow of tar is carried off through the siphon $a$, while the gas, after being freed from tar, passes off through the pipe $b$. I thus combine a hydraulic main, a seal, and a condenser in one cylinder.

G represents a vessel of any suitable dimensions, provided near its bottom with an interior horizontal perforated diaphragm, $b$; and above the same the vessel is, by a vertical sealed partition, $d$, divided into two compartments, which are filled with rye-straw, cut in bunches and set on end, as represented at H H.

The pipe $b$, which conducts the gas from the cylinder D, enters the vessel G at or near the top of one of the compartments therein, the gas passing, through the rye-straw in said compartment, downward through the perforated diaphragm $h$. It then passes up through said diaphragm on the other side of the sealed partition $d$, up through the rye-straw in that compartment, and out through a pipe, $e$.

By experiments I have found that, for a dry-scrubber, rye-straw cut in bunches, and set on end, is the best material for removing the ammonia and other liquids from the gas.

The pipe $e$ conducts the gas from the scrubber to the purifier I I, which is divided into three compartments, 1, 2, and 3, as shown, and said compartments are each provided with two perforated diaphragms, $i$ $i$, forming two spaces in each for the purifying materials, as hereinafter described. In the bottom of the compartment 1 is placed tan-bark, and in the top whiting. In the top of compartment 2 is placed chloride of lime, and in the bottom sponge saturated with petroleum; and in compartment 3 is placed ordinary slaked lime.

The gas from the scrubber passes through the pipe $e$ into the purifier, under the compartment 1, and rises through the tan-bark and whiting, for removing all ammonia yet remaining, and then passes downward through the chloride of lime and the petroleum-sponge in compartment 2, whereby the gas is enriched and its illuminating power materially increased. The gas then passes up through the slaked lime in compartment 3, whereby all the sulphur is taken out, and then goes through a pipe, $f$, to an ordinary gas-holder, J.

Having thus fully described my invention, what I claim as new, and desire to secure by Letters Patent, is—

1. In a coal-gas apparatus, a dry-scrubber, G, divided into compartments, filled with rye-straw cut in bunches and set on end, substantially as herein set forth.

2. A process for purifying gas, consisting of passing the gas successively through the chambers containing tan-bark, whiting, chloride of lime, sponge saturated with petroleum, and slaked lime, substantially as set forth.

In testimony that I claim the foregoing I have hereunto set my hand this 21st day of September, 1875.

ROBERT H. RAMSEY.

Witnesses:
ALEXANDER CHISHOLM,
JOHN R. MORTIMER.